United States Patent Office 3,370,324
Patented Feb. 27, 1968

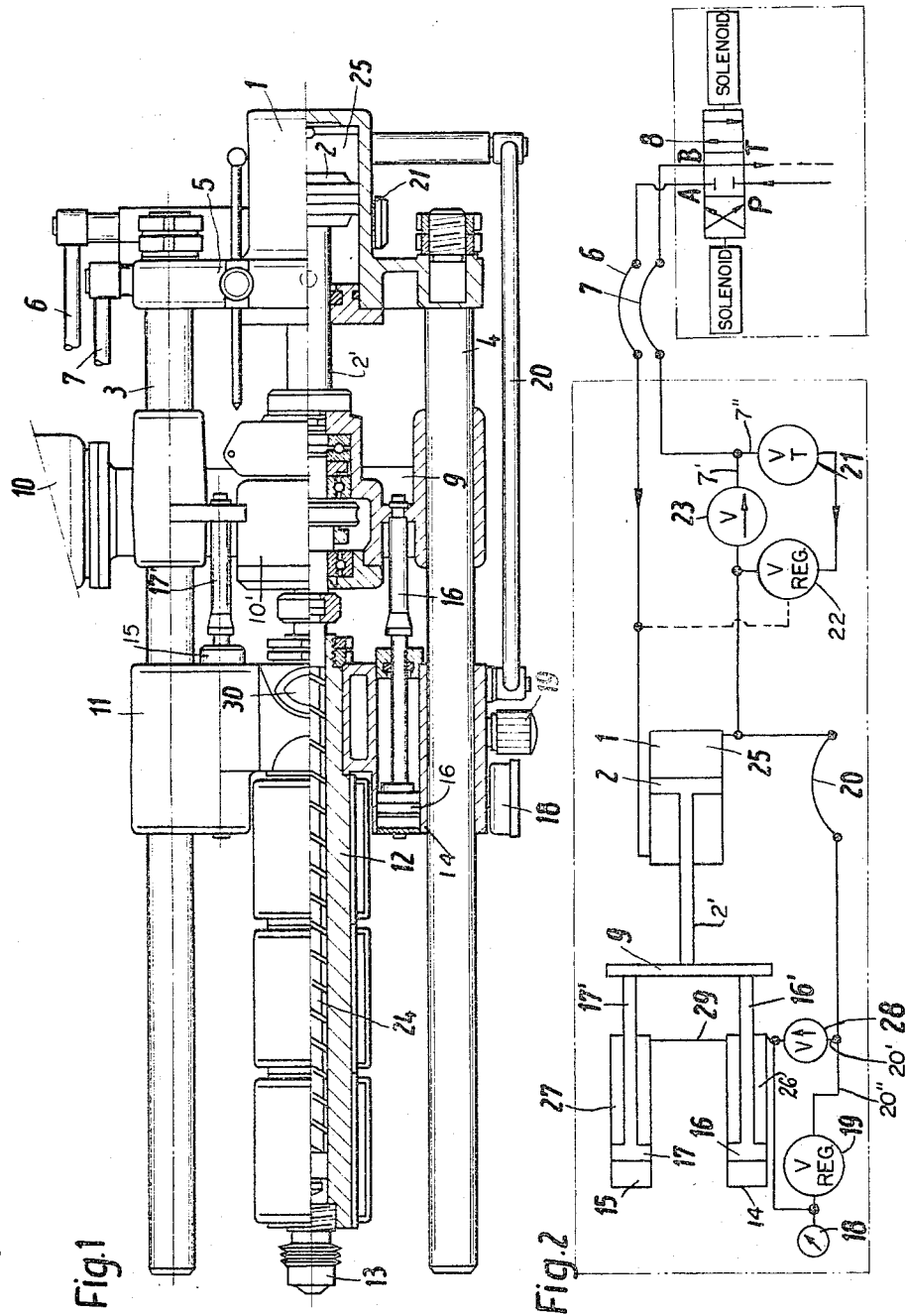

3,370,324
MOLD INJECTION UNIT
Karl Hehl, Lossburg, Wurttemberg, Germany, assignor to Arburg Maschinenfabrik Hehl & Sohne, Lossburg, Wurttemberg, Germany
Filed Oct. 5, 1965, Ser. No. 493,052
Claims priority, application Germany, Oct. 6, 1964, A 47,258
6 Claims. (Cl. 18—30)

ABSTRACT OF THE DISCLOSURE

A device for injecting a mass of plastic into a mold, the operating flexibility of the device and the speed at which it can be operated being enhanced by mounting the conveyor screw for axial sliding movement in the injection cylinder, by controlling the axial movement by means of the piston of a stationary hydraulic cylinder, and by controlling the rotation of the screw by a separate rotary drive.

---

The present invention relates to an injection device, and particularly to a device for injecting a mass of plastic into a mold.

This invention is concerned with an injection device provided with a conveyor screw mounted to slide axially in an injection cylinder, the axial movement of the conveyor screw being controlled by the piston of a stationary hydraulic cylinder and the rotation of the screw being controlled by a separate rotary drive.

It is desirable to construct such an injection device so that the injection pressure and injection speed which it generates can be varied over a wide range to satisfy the required conditions for a wide variety of plastic materials.

It is an object of the present invention to facilitate the injection of plastic materials into molds.

It is another object of the present invention to provide means capable of satisfactorily injecting a wide variety of plastic materials.

Yet another object of the present invention is to permit the injection of plastic materials into a mold, or molds, to be carried out at a high rate.

These objects are achieved, according to the present invention, by the provision of a device having an injection cylinder equipped with a closable outlet nozzle at one end and enclosing a plastic storage chamber adjacent the nozzle, this cylinder being mounted to slide between a retracted position, in which the nozzle is spaced from a mold, and a forward position, in which the nozzle is in contact with an inlet for the mold. The device also comprises injection plunger means disposed in the injection cylinder to slide with respect thereto between a first position, in which one end of the injection plunger means is adjacent the storage chamber, and a second position, in which this one end of the injection plunger means is disposed at least partially in the storage chamber. Additionally, first drive means are provided to drive the injection cylinder from the retracted position to the forward position and for subsequently driving the injection plunger means to its second position, and second drive means are provided between the cylinder and the injection means for applying a packing pressure to the plastic in the storage chamber and for aiding the driving of the injection means, in the cylinder, from its first position to its second position after the cylinder itself has been placed in its forward position and the outlet nozzle passage has been opened. Electronic control means are provided for actuating the various drive means in the desired sequence and for returning the cylinder to its retracted position and the injection means to its first position after the injection operation has been completed.

According to a preferred embodiment of the present invention, the device is constructed so as to have an axially slidable injection cylinder and a rotatable conveyor screw, constituting the injection means, disposed in the injection cylinder to slide axially relative thereto. A stationary hydraulic cylinder is provided with a slidable piston connected to drive the conveyor screw in an axial direction. Rotary drive means are connected to rotate the screw in order to feed plastic material to the outlet end of the injection cylinder. Additional hydraulic cylinders are disposed around, and rigidly connected to, the injection cylinder, and are each provided with a slidable piston rigidly connected to the piston of the stationary hydraulic cylinder. The device is provided with hydraulic control means connected to all of the cylinders for applying the same hydraulic pressure to all of them when the injection cylinder is being driven into contact with the inlet of a mold and for applying hydraulic pressure to the additional hydraulic cylinders so as to drive the conveyor screw forward in the injection cylinder for injecting plastic material contained in the cylinder into the mold. The control means are also arranged to impede the return travel of the pistons associated with the additional cylinders when the injection cylinder is in its retracted position, the pressure in these additional cylinders then serving to apply a packing pressure to the plastic material in the injection cylinder.

Advantageously, the stationary cylinder piston is rigidly connected to the pistons of the additional cylinders.

The control means are preferably provided with a one-way valve for supplying hydraulic fluid to the additional cylinders and with a pressure regulating valve for the outflow of hydraulic fluid from these cylinders.

According to another feature of the present invention, the control means also include a series arrangement of a throttle valve and a pressure regulating valve through which hydraulic fluid flows into the stationary cylinder and a one-way valve connected in parallel therewith for the flow of hydraulic fluid from the stationary cylinder when the piston associated therewith is undergoing its return travel.

Additional objects and advantages of the present invention will become apparent upon consideration of the following description when taken in conjunction with the accompanying drawings in which:

FIGURE 1 is a plan view, partly in section, of an injection unit constituting a preferred embodiment of the present invention.

FIGURE 2 is a schematic diagram of the control arrangement for the unit of FIGURE 1.

Referring now to the drawings, the injection unit shown in FIGURE 1 comprises an injection cylinder 12 which is provided with heating jackets and with an outlet nozzle 13. Nozzle 13 is preferably constructed so that the passage defined therein opens automatically when the nozzle is forced against a mold inlet. An axially slidable conveyor screw 24 is disposed in the cylinder 12 and is connected to be driven by the piston 2 of a stationary hydraulic cylinder 1. Rotary drive means 10, 10' are connected to induce a rotary motion in the screw 24 and form a structural unit therewith. This unit is slidably mounted on a pair of horizontal, parallel support bars 3 and 4 through the intermediary of a carriage 9, while the cylinder 12 is similarly mounted on these bars through the intermediary of a carriage 11, the two support members being slidable independently of each other. At one end of the bars 3 and 4, the hydraulic cylinder is mounted through the intermediary of a stationary support member 5. Oil for producing the forward stroke (to the left in FIGURE 1) of piston 2 is introduced into the cylinder 1 through a conduit 7, while the oil for producing the backward stroke (to the right in FIGURE 1) is introduced into cylinder 1 through a conduit 6. The direction of flow of oil in these conduits is controlled by an electromagnetic slide valve 8 (shown schematically in FIGURE 2) which is positioned in an oil tank (not shown). Oil is fed to the slide valve 8 by a feed pump through the intermediary of an oil distributor, neither of which is shown because they constitute well-known, commercially available devices.

Two hydraulic cylinders 14 and 15 are mounted in the carriage 11 symmetrically about the cylinder 12. These hydraulic cylinders are provided with pistons 16 and 17, respectively. Piston 16 is rigidly connected to a piston rod 16' and piston 17 is rigidly connected to a piston rod 17', the piston rods 16' and 17' being slidably mounted in their respective cylinders 14 and 15. The piston rods 16' and 17' are rigidly connected to carriage 9, as is the piston rod 2' of piston 2. Thus, the piston 2 is rigidly connected to the pistons 16 and 17.

The conduit 7 delivers oil into the cylinder chamber 25 to the right of piston 2, while the conduit 6 delivers oil into a cylinder chamber in cylinder 1 disposed to the left of piston 2. These conduits are connected to four-way control valve 8, which is constructed to permit oil to flow out of cylinder 1 through one of the conduits while oil is flowing into the cylinder 1 through the other conduit. To this end, slide valve 8 is provided with an inlet P, an outlet T, and two intermediate openings A and B and is provided with an arrangement for selectively connecting the intermediate passages to respective ones of inlet P and outlet T in either order. The valve 8 is switched between its two positions by a pair of solenoids which are selectively actuated by the electronic control for the injection molding machine at suitable instants during the cycle of operation of the machine. The electronic control for the machine is not shown here because it is constituted by well-known elements, such as microswitches placed in the path of travel of various parts, which form no part of the present invention. The conduit 6 is connected directly between the opening A of valve 8 and its respective cylinder chamber, while the conduit 7 is connected between the opening B of valve 8 and a junction connecting two branches 7' and 7". The branch 7" is provided with a throttle valve 21 for regulating the flow rate of hydraulic fluid and a pressure regulating valve 22. The other branch 7' is provided with a one-way valve 23 which permits hydraulic fluid to flow only in a direction from cylinder chamber 25 to the slide valve 8. One-way valve 23 thus conveys hydraulic fluid from chamber 25 when piston 2 is going through its backward stroke. The branches 7' and 7" are connected together at a junction which is connected directly to cylinder chamber 25.

It is desirable for the pistons 16 and 17 to receive hydraulic fluid flowing from the same source, and at the same pressure, as the piston 2. To this end, a conduit 20 is connected between the chamber 25 of cylinder 1 and one junction of two parallel branches 20' and 20". The branch 20" contains a pressure regulating valve 19 and a manometer 18, while the branch 20' includes a one-way valve 28 through which hydraulic fluid can flow only in a direction from cylinder chambers 26 and 27. The other junction for branches 20' and 20" is connected to the cylinder chamber 26 of cylinder 14, and a conduit 29 connects the cylinder chamber 26 to the corresponding chamber 27 of cylinder 15.

The device operates in the following manner: With the injection cylinder 12 in its retracted position, and with valve 8 in its first position wherein inlet P communicates with opening A while outlet T communicates with opening B, plastic material introduced into cylinder 12 through an inlet 30 is conveyed by the rotation of screw 24 in the direction of outlet nozzle 13. During its travel through the cylinder 12, the plastic is melted by heat supplied by the surrounding heating jackets. Sufficient plastic material is conveyed to fill a storage chamber defined by the portion of cylinder 21 to the left of screw 24. Once this storage chamber has become filled to capacity, the continuing delivery of plastic material thereto by the rotation of the axially stationary screw 24 produces a force which automatically urges the cylinder 12 and its carriage 11 to the left, in the direction of a mold to be connected to outlet nozzle 13. The cylinders 14 and 15 move together with the cylinder 12 while the pistons 16 and 17 remain stationary during this interval. The force applied by the plastic in the storage chamber on cylinder 12 induces a reaction force which has the effect of packing down the plastic material contained in this chamber. In order to permit this movement of cylinder 12 and its associated carriage 11, which movement also causes a relative displacement of the cylinders 14 and 15 with respect to their associated pistons 16 and 17, it is necessary that hydraulic fluid be permitted to flow out of the cylinder chambers 26 and 27. This outflow is permitted to occur through the pressure regulating valve 19 disposed in branch 20". The provision of a pressure regulating valve 19 permits the packing pressure applied to the plastic material in the storage chamber to be readily regulated. The corresponding pressure of the fluid leaving chambers 26 and 27 is indicated by manometer 18. After the storage chamber in cylinder 12 has been filled and the plastic material therein has been subjected to the desired packing pressure, the rotation of the conveyor screw 24 is stopped and the valve 8 is automatically switched to its second position to cause hydraulic fluid to flow into the chamber 25 of cylinder 1 via opening B, the conduit 7 and the branch 7". This operation also causes hydraulic fluid to be delivered to the chamber 26 of piston 14 via conduit 20 and branch 20' and to the chamber 27 of piston 15 via the conduit 29. Thus, the pistons 2, 16 and 17 are all subjected to the same hydraulic fluid pressure simultaneously.

The hydraulic fluid introduced into chamber 25 drives piston 2 forward, causing the carriages 9 and 11 and the elements carried thereon to be driven together as a unit toward the left until the outlet nozzle 13 comes into contact with the inlet for the mold (not shown). Once contact is made, carriage 11 does not experience any noticeable additional movement. However, the fluid pressure in chambers 25, 26 and 27 continues to urge the cylinder 12 to the right with respect to conveyor screw 24.

When the nozzle 13 comes in contact with the mold inlet, the passage defined by this nozzle is opened automatically, permitting piston 2 to complete its forward stroke and permitting pistons 16 and 17 to go through their forward strokes (to the left) in their respective cylinders 14 and 15. These forward strokes drive the conveyor screw axially forward in cylinder 12, the force produced by pistons 16 and 17 creating a substantial increase in both the injection pressure and speed. After the injection of plastic material has been completed, four-way valve 8 is switched back to its first position to permit hydraulic fluid to be delivered through conduit 6 into cylinder 1 in order to drive piston 2 through its backward stroke. The return movement of piston 2 acts to move carriages 9 and 11, and the units mounted thereon, backward so that outlet nozzle 13 is retracted from the molt inlet, the passage in nozzle 13 closing automatically.

After piston 2 has completed its backward stroke, conveyor screw 24 is once again placed in rotation by electronic switching means and a new injection cycle begins. It should be noted that very little fluid is permitted to leave the chambers 26 and 27 of pistons 14 and 15 during the return stroke of piston 2, because the outflow of fluid from these chambers is impeded by valve 19.

It may thus be seen that the present invention provides a relatively inexpensive apparatus which permits a considerable increase in the injection speed and pressure obtainable and in the repetition rate with which the injection operation is performed.

It will be understood that the above description of the present invention is susceptible to various modifications, changes, and adaptations, and the same are intended to be comprehended within the meaning and range of equivalents of the appended claims.

What is claimed is:

1. An injection device for injecting plastic material into a mold, comprising, in combination:
   (a) an axially slidable injection cylinder;
   (b) a rotatable conveyor screw disposed in said injection cylinder to slide axially relative thereto;
   (c) a stationary hydraulic cylinder;
   (d) a slidable piston disposed in said stationary cylinder and connected to drive said conveyor screw in an axial direction;
   (e) rotary drive means connected to rotate said screw;
   (f) at least one additional hydraulic cylinder rigidly connected to said injection cylinder;
   (g) at least one additional piston slidably disposed in said additional cylinder and connected to said slidable piston; and
   (h) hydraulic control means connected to said cylinders for applying the same hydraulic pressure to all of said pistons when said slidable piston moves in one direction and for impeding the return travel of said additional piston when said slidable piston moves in the other direction.

2. An arrangement as defined in claim 1 wherein all of said pistons are rigidly connected together.

3. An arrangement as defined in claim 1 wherein said hydraulic control means comprises; a one-way valve connected to deliver hydraulic fluid to said at least one additional cylinder; and a pressure regulating valve connected in parallel with said one-way valve for permitting the outflow of fluid from said additional cylinder.

4. An arrangement as defined in claim 1 wherein said hydraulic control means comprises: a throttle valve and a pressure regulating valve connected in series therewith for delivering hydraulic fluid to said stationary cylinder; and a one-way valve connected in parallel with said first-mentioned valves for conveying hydraulic fluid away from said stationary cylinder.

5. An arrangement as defined in claim 1 further comprising: a first carriage carrying said injection cylinder; a second carriage carrying said conveyor screw and said rotary drive means; and a pair of parallel support bars upon which said carriages are slidably mounted; and wherein said at least one additional cylinder comprises two additional cylinders carried by said first carriage and disposed symmetrically about said injection cylinder.

6. An arrangement as defined in claim 5 further comprising a plurality of piston rods, one for each of said pistons, each having one end rigidly connected to its respective piston and the other end rigidly connected to said second carriage.

References Cited

UNITED STATES PATENTS

| | | | |
|---|---|---|---|
| 3,020,591 | 2/1962 | Breher et al. | 18—30 |
| 3,165,785 | 1/1965 | Hehl | 18—30 |
| 3,259,943 | 7/1965 | Kovach et al. | 18—30 |

WILBUR L. McBAY, *Primary Examiner.*